United States Patent [19]

Murakami et al.

[11] Patent Number: 4,954,193
[45] Date of Patent: Sep. 4, 1990

[54] METHOD FOR MAKING A GRAPHITE FILM OR SHEET

[75] Inventors: Mutsuaki Murakami, Tokyo; Naomi Nishiki, Kyoto; Susumu Yoshimura, Yokohama; Kazuhiro Watanabe, Kawasaki, all of Japan

[73] Assignees: Matsushita Electric Industrial Co., Ltd., Osaka; Research Development Corporation of Japan, Tokyo, both of Japan

[21] Appl. No.: 236,999

[22] Filed: Aug. 26, 1988

[30] Foreign Application Priority Data

Aug. 26, 1987 [JP] Japan ................. 62-212112
Aug. 26, 1987 [JP] Japan ................. 62-212113

[51] Int. Cl.$^5$ .................... B32B 31/20; B32B 31/26
[52] U.S. Cl. .................... 156/155; 264/296; 264/297; 423/499
[58] Field of Search ........... 423/499; 264/29.6, 29.7, 264/29.1; 156/155; 427/227, 228

[56] References Cited

U.S. PATENT DOCUMENTS

| | | | |
|---|---|---|---|
| 3,492,197 | 1/1970 | Olstowski et al. | 264/29.1 X |
| 3,509,017 | 4/1970 | Accountius | 156/155 X |
| 3,616,045 | 10/1971 | Kozar et al. | 156/155 X |
| 3,626,042 | 12/1971 | Appleby et al. | 423/449 X |
| 4,279,952 | 7/1981 | Kodama et al. | 156/155 X |
| 4,456,645 | 6/1984 | Chi | 156/155 X |
| 4,539,229 | 9/1985 | Schieber | 427/228 X |
| 4,627,944 | 12/1986 | Murakami et al. | 423/449 X |

FOREIGN PATENT DOCUMENTS

| | | | |
|---|---|---|---|
| 0203581 | 12/1986 | European Pat. Off. | |
| 0122711 | 7/1985 | Japan | 423/449 |
| 0195014 | 10/1985 | Japan | 423/449 |
| 0239358 | 11/1985 | Japan | 264/29.1 |
| 1058808 | 3/1986 | Japan | 423/449 |
| 61-275117 | 12/1986 | Japan. | |

OTHER PUBLICATIONS

Oberlin, "Carbonization and Graphitization", Carbon, vol. 22, No. 6, pp. 521-541, 1984.

Primary Examiner—Merrell C. Cashion, Jr.
Attorney, Agent, or Firm—Lowe, Price, LeBlanc, Becker & Shur

[57] ABSTRACT

A method for making a graphite sheet or block with a desired thickness which comprises hot pressing at least two films of a polymer selected from a polyoxadiazole, an aromatic polyamide and an aromatic polyimide at a pressure not lower than 4 kg/cm$^2$ at temperatures not lower than 2200° C. Prior to the hot pressing, the at least two films may be thermally treated at temperatures of not lower than 2200° C. and subsequently hot pressed at a pressure of not lower than 4 kg/cm$^2$ at a temperature of not lower than 2000° C. when the at least two films are made of the polyoxadiazole or aromatic polyamide or at a temperature of not lower than 1600° C. when the at least two films are made of the aromatic polyimide.

12 Claims, 1 Drawing Sheet

METHOD FOR MAKING A GRAPHITE FILM OR SHEET

BACKGROUND OF THE INVENTION

1. Field of the Invention

This invention relates to a method for making a graphite film or sheet or block which is adapted for use in X-ray optical elements, X-ray monochromators, neutron ray diffraction mirrors or filters. The invention also relates to radiation optical elements using the graphite film.

2. Description of the Prior Art

Graphite is very important as an industrial material because of its remarkably high resistances to heat and chemicals and high conductivity. It has accordingly wide utility in the fields of electrodes, heating elements and other structural materials. Among various types of graphite, artificial graphite having similar characteristics to single crystal graphite has been widely employed as a monochromator or filter for X-rays or neutral rays or as a spectral crystal. This is because the artificial graphite has good spectral and reflective characteristics with respect to the X-rays or neutron rays.

As a matter of course, single crystal graphite may naturally occur but high quality graphite is limited in amount of production. In addition, naturally occurring graphite is obtained in the form of powder or small blocks and is thus difficult to handle. Accordingly, such graphite has often been prepared artificially.

The preparation of the artificial graphite can be broadly classified into the following two groups.

The first group includes sedimentation from Fe, Ni/C melts, decomposition of carbides of Si, Al and the like, or cooling of a carbon melt under high temperature and high pressure conditions. The graphite obtained from this group has substantially the same physical properties as natural graphite called kish graphite. However, the graphite obtained according to the methods of the first group is in the form of fine flakes. Additionally, the methods are complicated, so that the production costs becomes high. Thus, the methods of this group are rarely used industrially at present.

The second group includes a method in which a hydrocarbon gas is pyrogenically deposited in a gas phase and hot processed. The method includes a further step of re-annealing the deposited product under a pressure at a temperature of 3400° C. for a long time. The resultant graphite is called highly oriented pyrographite (HOPG) and exhibits characteristics similar to those of natural graphite. The graphite obtained by this method has a larger size than the kish graphite. However, the method is also complicated with a low yield, thus leading to high production costs.

On the other hand, graphitization of various organic matters or carbonaceous materials has been long considered in which the organic matters or carbonaceous materials are heated over 3000° C. However, this method has not been successful in obtaining graphite whose physical properties are similar to those of natural or kish graphite. For instance, the electric conductivity along the direction of ab planes which is one of typical physical properties is 1 to $2.5 \times 10^4$ S/cm for natural or kish graphite. The conductivity of the graphite obtained by the above method is usually as low as 1 to $2 \times 10^3$ S/cm. This means that the graphitization does not completely proceed when organic matters or carbonaceous materials are treated by the method.

In the graphitization method, it is ordinary to use as starting materials a carbonaceous material such as coke and coal tar as a binder. When coke or charcoal is heated to about 3000° C., the resultant carbon has a number of structures including a structure relatively close to the structure of graphite and a structure which is completely different from the graphite structure. Carbon which relatively readily converts into a graphite structure simply by heat treatment is called ready-to-graphitize carbon. The other type of carbon is called hard-to-graphitize carbon. The reason why the difference in the structure is produced has close relation with a graphitization mechanism. More particularly, whether graphitization proceeds readily or not depends upon whether structural defects present in a carbon precursor are likely to be removed by the thermal treatment. This means that the fine structure of the carbon precursor plays an important role with respect to the graphitization.

In contrast to the method using coke and a binder as starting materials, several studies have been made on methods using polymer materials to form graphite films. In this method, use is made of the molecular structures of polymer materials and the fine structure of the resultant carbon precursor is properly controlled. The method includes thermal treatment of a polymer in vacuum or in an inert gas and formation of a carbonaceous product through decomposition and polycondensation reactions. However, it is known that high quality films of graphite cannot always be obtained using any polymers as starting materials, because almost all polymeric materials cannot be used for this purpose. For instance, a number of polymers have been thermally treated including phenol-formaldehyde resins, polyacrylonitrile, fibers of polyamides, poly-p-phenylene, poly-p-phenylene oxide, polyvinyl chloride and the like. These polymers have been found to be hard-to-graphitize materials, from which any substances having a high degree of graphitization have not been obtained yet.

We have made extensive studies on graphitization of a number of polymers. As a result, it has been found that when films of certain polymers are thermally treated at certain temperatures, they are more readily graphitized than known polymer materials. Such polymers include polyoxadiazole, aromatic polyimides, polybenzothiazoles, polybenzooxazole, polybenzobisoxazole, polythiazole, and films of aromatic polyamides. This graphitization is described in European Patent Application No. 0203581 and Japanese Laid-open Patent Application No. 61-275117.

According to the graphitization methods described above, the above-mentioned polymers are heated at 1800° C. or higher, preferably at 2500° C. or higher to obtain a graphite product having a high degree of graphitization within a relatively short time.

Although graphite products with good properties are obtained by the above methods, such methods have the following disadvantages.

One of the disadvantages resides in that a thick graphite sheet or block cannot be obtained. One may consider that the graphitization reaction is irrelevant with a thickness of a starting film. In fact, the reaction depends strongly upon the thickness of starting film. This is shown by the following experiment conducted by us. Four films of a polyoxadiazole with different thicknesses were graphitized to determine a lattice constant of the resultant graphite, a degree of graphitization and an electric conductivity along the direction of ab planes. The results are shown in Table 1 below.

TABLE 1

| Thickness of Starting Film (micrometers) | Treating Temp. (°C.) | Lattice Constant (angstroms) | Degree of Polymerization (%) | Conductivity (along ab planes) (S/cm) |
|---|---|---|---|---|
| 5 | 2600 | 6.710 | 99 | 9800 |
| 25 | 2600 | 6.713 | 97 | 7800 |
| 100 | 2600 | 6.720 | 93 | 6100 |
| 450 | 2600 | 6.731 | 87 | 4900 |

As will be apparent from the above results, the degree of the graphitization reaction varies with the thickness of the starting film. More particularly, the degree of graphitization varies from 99 to 87% depending upon the thickness of the film. This reveals that a thin film of graphite can be obtained from the polyoxidiazole but it is difficult to obtain a thick sheet or block of graphite.

The above fact is true of other polymers. For instance, when aromatic polyimide films having thicknesses of from 5 to 450 micrometers were graphitized, the degree of graphitization was found to be from 98 to 83%. For aromatic polyamide films, the degree of graphitization was from 99 to 88% when film thicknesses were from 10 to 600 micrometers.

The second disadvantage is that when polymer materials are merely heated, the resultant graphite is not improved in the characteristic of how to neatly superpose the planes along the ab axes of graphite on the direction of the c axis. This characteristic is important when the graphite is used as an optical element for X-ray. The degree of superposition of the ab planes is measured by a rocking method using X-ray diffraction. For using graphite crystals as an optical crystal element such as for X-rays, the rocking characteristic should generally be not larger than 0.4° for a graphite film whose thickness is not larger than 50 micrometers, and not larger than 3° for a 1 mm or thicker graphite block or sheet. The graphite films obtained from polyoxidiazole films indicated in Table 1 had, respectively, a rocking characteristic of 6.7°, 10.5°, 12° and 17° for the starting film thicknesses of 5, 25, 100 and 450 micrometers. This demonstrates that graphitization by mere heating cannot provide an X-ray element with a good rocking characteristic. Similarly, with graphite products obtained from aromatic polyimide films, the rocking characteristic was 8°, 11°, 14° and 17° for the thicknesses of the starting films of 5, 25, 100 and 450 micrometers, respectively. With graphite products obtained from aromatic polyamide films, the rocking characteristic was 7.5°, 9.5°, 11° and 16° for the thicknesses of the starting films of 10, 25, 100 and 600 micrometers. Thus, a satisfactory rocking characteristic cannot be obtained.

This is considered as follows: when the film becomes thicker, the ab planes are more unlikely to be oriented because of the generation of a gas from the inside of a sample accompanied by the thermal treatment.

SUMMARY OF THE INVENTION

It is accordingly an object of the present invention to provide a method for making a thin to thick graphite sheet or block from polymer films which overcomes the disadvantages involved in the prior art methods.

It is another object of the invention to provide a method for making a graphite sheet or block which has a significantly improved rocking characteristic and a high degree of graphitization.

It is a further object of the invention to provide a radiant ray element which uses a graphite sheet or block of the type mentioned above.

The method for making a graphite sheet or block according to the invention comprises:

(a) providing at least two films made of a polymer selected from the group consisting of a polyoxadizole, an aromatic polyimide and an aromatic polyamide; and (b) pressing the at least two films under a pressure of not lower than 4 kg/cm² at a temperature of not lower than 2200° C. for a time sufficient for graphitization of the films in an inert gas, thereby obtaining a graphite sheet or block.

In order to cause the hot pressing to proceed more smoothly, it is preferred that the at least two films are thermally treated, prior to the hot pressing, at a temperature of not lower than 2200° C. for a time sufficient to graphitize the films and then the graphitized films are pressed to bond or combine them together, thereby obtaining the graphite sheet or block. In this case, the hot pressing conditions are slightly different from those conditions of the hot pressing alone. The graphitized films are hot pressed under a pressure of not lower than 4 kg/cm² at a temperature of not lower than 2000° C. when the at least two films are made of the polyoxadiazole or aromatic polyamide, or at a temperature of not lower than 1600° C. when the at least two films are made of the aromatic polyimide.

The thus obtained graphite sheet or block can be used, as it is, as a radiation optical element.

DETAILED DESCRIPTION AND EMBODIMENTS OF THE INVENTION

In accordance with the method of the invention, at least two films of a polymer selected from a polyoxadiazole, an aromatic polyimide and an aromatic polyamide are provided.

A typical polyoxadiazole useful in the present invention is poly(p-phenylene-1,3,4-oxadiazole) having recurring units of the following formula Useful isomerized polymers include poly(m-phenylene-1,3,4-oxadiazole), poly(p-phenylene-1,2,4-oxadiazole), poly(m-phenylene-1,2,4-oxadiazole), poly(o-phenylene-1,3,4-oxadiazole), poly(o-phenylene-1,2,4-oxadiazole), and copolymers of these oxadiazole isomers.

The aromatic polyimides are polymers obtained by reaction between dicarboxylic acid anhydrides and aromatic primary diamines and are represented, for example, by the following general formula

A typical aromatic polyimide is poly[N,N'-(p,p'-oxydiphenylene)pyromellitimide of the above formula in which $R_1$ represents and $R_2$ represents

This polymer is commercially available from Du Pont De Numerours under the designation of Kapton. In the above formula, $R_1$ may be and the like, and $R_2$ may be and the like.

The aromatic polyamides useful in the present invention have recurring units of the following formula in which $R_3$ represents and $R_4$ represents These polymers are used in the form of a film. For efficient graphitization treatment and impartment of good physical properties including a rocking characteristic, the film should preferably have a thickness of not greater than 400 micrometers although a thicker film may be used when higher temperature, higher pressure and longer time conditions for the graphitization are used.

The at least two films of the polymer may be directly hot pressed under appropriate heating and pressing conditions, or may be first thermally treated for graphitization and then hot pressed for combining the films into a sheet or block.

In the direct hot pressing procedure, the at least two films are superposed and subjected to hot pressing at temperatures of not lower than 2200° C. for a time sufficient for graphitization and bonding of the films to obtain a graphite sheet or block. The pressing time may vary greatly depending upon the hot pressing temperature. For instance, when the temperature is 2200° C., the sufficient time is several hours or ten hours or longer. When the temperature used in 3000° C., the time required for the graphitization may be 30 minutes or longer. Higher temperatures result in a shorter time. Temperatures lower than 2200° C. are undesirable because the films may not be graphitized as desired or may not be combined into a sheet or block. The graphitization is effected in an inert gas such as nitrogen or argon. Preferably, the hot pressing is carried out at a temperature of not lower than 2500° C. at a pressure of not lower than 40 kg/cm$^2$ in view of efficient conversion or combination of the films into a sheet or block and efficient production of graphite with desired physical properties.

By the hot pressing, two to about ten hundreds films may be combined into a sheet or block. The number of films to be hot pressed depends upon the purpose of a final graphite sheet or block. The final graphite sheet or block can have several micrometers to several millimeters according to the invention.

The polymer films used in the present invention decompose at 400° to 700° C. For preventing contamination of a hot press apparatus with the decomposition product of the polymer films, the films may be pre-treated at low temperatures sufficient for the decomposition, e.g. 1000° C. or lower. If a furnace is used for the thermal graphitization treatment as will be described below, the above low temperature treatment is particularly effective in order to avoid contamination of the furnace.

As described before, the formation of a graphite sheet or block from at least two polymer films may be effected by a procedure including thermal treatment and hot pressing instead of the hot pressing alone. This procedure is described below.

Prior to hot pressing, the at least two films may be thermally treated for graphitization at temperatures of not lower than 2200° C. for a time sufficient for graphitization. The graphitized film obtained by the thermal treatment at 2200° C. or higher is a relatively soft film, which is convenient for the subsequent hot pressing step. This is because the soft film is unlikely to break upon pressing. In contrast, a film thermally treated at temperatures lower than 2200° C. consists predominantly of hard carbon and will often be cracked during the hot pressing. This is one of the advantages of the thermal treatment of the film at 2200° C. or higher. In this connection, however, the graphitization reaction proceeds only by hot pressing provided that the hot pressing is effected at temperatures of not lower than 2200° C. and, thus, the thermal treatment is not always essential but may be omitted. In other words, the thermal treatment is not necessary if breakage of the films during the hot pressing can be prevented. This is possible by controlling the pressing force in relation to the heating temperature as will become apparent from examples.

When the films are thermally treated, it is preferred to place the film being thermally treated between two graphite substrates. By this, the resultant film becomes flat without involving any creases.

The at least two films which have been thermally treated or graphitized in the preceding step are subsequently superposed and subjected to hot pressing at temperatures of not lower than 2000° C. for the polyoxadiazole or aromatic polyamide films or at temperatures of not lower than 1600° C. for the aromatic polyimide films at a pressure of not lower than 4 kg/cm$^2$. As a result, the films can be fully combined under pressure to obtain a graphite sheet or block. The hot pressing conditions in this case are slightly different from those conditions of the one-step hot pressing procedure as described before. This is because graphitization during hot pressing is not necessary in the procedure including thermal treatment.

If the hot pressing temperature is lower than 2000° C. and the pressure is lower than 4 kg/m$^2$ for the polyoxadiazole or aromatic polyamide films, the films may not be bonded or combined together. This is true of the aromatic polyimide films, but the conditions in this case include a temperature lower than 1600° C. and a pressure lower than 4 kg/cm$^2$. The hot pressing is preferably effected at a temperature of not lower than 2500° C. at a pressure of not lower than 40 kg/cm$^2$ similar to the case of hot pressing alone.

The graphite sheet or block obtained according to the invention has a particularly good rocking characteristic, which will be defined hereinafter. For instance, four types of polyoxadiazole films with different thicknesses are thermally treated at 2600° C. Four thermally treated films of each type are hot pressed at 2600° C. at a pressure of 20 kg/cm$^2$, thereby obtaining four types of graphite products with thicknesses of 16, 80, 320 and 1600 micrometers, respectively. The graphite products have, respectively, significantly improved rocking characteristics of 1.2°, 1.4°, 1.6° and 1.9°.

Aromatic polyimide films are treated in the same manner as with the polyoxadiazole films except that the hot pressing is effected at 1800° C. at a pressure of 20 kg/cm$^2$, and the rocking characteristics of the graphite products with thicknesses of 16, 80, 320 and 1600 micrometers are, respectively, 1.2°, 1.4°, 1.6° and 1.7°. In the case of aromatic polyamide films treated in the same manner as the polyoxadiazole films, the rocking characteristics are 1.2°, 1.4°, 1.6° and 1.9° for thicknesses of 24, 80, 320 and 1800 micrometers, respectively. These values reveal that the graphite sheet or block obtained by the method of the invention is very high in quality.

Figure 1:
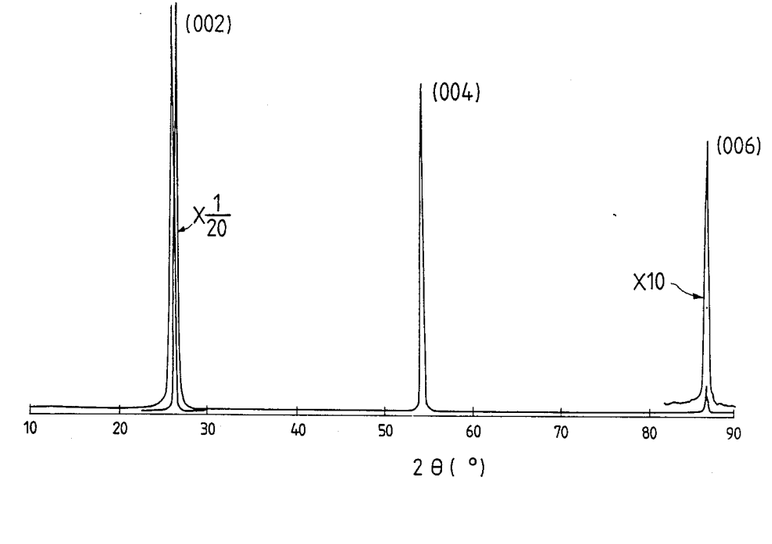
The sole FIGURE is an X-ray diffraction pattern of a graphite block obtained according to the invention.

The thus obtained graphite sheet or block has wide utility particularly as optical elements for radiant rays. The utility of the graphite block, for example, as an X-ray monochromator is based on the following principle with reference to the sole FIGURE.

The FIGURE shows an X-ray diffraction pattern of a graphite block obtained by thermally treating 20 polyoxadiazole films, each having a thickness of 25 micrometer, at 2800° C. and hot pressing the films. The reflection lines against CuKα (1.5418 angstroms) are only from the planes of (002), (004) and (006) as is shown in the FIGURE. The most intensive reflection line from the plane (002) has a center at $2\theta = 26.576°$. The reflectivity of this line reaches 20%. The X-ray monochromator makes use of the strong reflection from the plane (002). When an X-ray from an X-ray source and a graphite monochromator are set at an angle of 13.288° in the case where the CuKα ray is used, a stronger X-ray can be obtained.

The present invention is more particularly described by way of examples. Various characteristics are measured and determined in the examples. The meanings and measurements of the characteristics are first described.

In general, a degree of graphitization is expressed using X-ray diffraction parameters including a lattice constant and a size of a crystal along the direction of c axis, and a rate of graphitization calculated from these parameters. An electric conductivity is often used to express the degree of graphitization. The lattice constant is calculated from the position of a diffraction line (002) of an X-ray. The lattice constant of natural single crystal graphite is 6.708 angstroms. Accordingly, artificial graphite having a lattice constant closer to the value of the natural single crystal graphite is considered to have a more developed structure of graphite. The size of the crystal along the direction of the c axis is calculated from a half-value width of the diffraction line (002). A larger value exhibits a more developed plane structure of graphite. The size of the crystal of natural single crystal graphite is over 1000 angstroms. The rate of graphitization is calculated according to the method described in Les Carbons Vol. 1, p. 129, (1965), in which a space between crystal faces, ($d_{002}$), is used for the calculation. This rate is 100% for natural single crystal graphite.

The electric conductivity is a value along the direction of the ab planes of graphite. Natural single crystal has a conductivity of 1 to $2.5 \times 10^4$ S/cm. A higher conductivity indicates a more resemblance to a graphite structure.

The rocking characteristic is one of X-ray diffraction parameters exhibiting a manner of superposition of ab planes. This characteristic is a diffraction intensity curve which is obtained by rotating a crystal when monochromic parallel X-ray fluxes are passed in such a way that the value of $2\theta$ is fixed at an angle where a diffraction line of (001) appears and the angle of diffraction, $\theta$, is rotated. The rocking characteristic is expressed as an angle of rotation. A smaller angle shows a clearer superposition of the ab planes.

In the examples, the physical properties of graphite were determined according to the following methods.

1. Lattice constant (Co)

An X-ray diffractometer PW-1051, available from Philips Inc., was used to measure an X-ray diffraction pattern of a sample by the use of a CuK alpha ray. The value of Co=2 d was calculated from a diffraction line (002) appearing in the vicinity of $2\theta = 26°$ to 27° by the use of the Black equation of $n\lambda = 2 d \sin \theta$. In the equation, n=2, and x is a wavelength of the X-ray used.

2. Rate of graphitization (%)

The rate of graphitization was calculated from a plane space, d, using the following equation.

$$d_{002} = 3.354 g + 3.44(1-g)$$

in which g is a degree of graphitization. When g=1, a product shows complete graphite, and when g=0, it shows amorphous carbon.

3. Electric conductivity (S/cm)

A sample was attached with four terminal electrodes using a silver paste and a gold wire, and a constant current was passed from outer electrodes to measure a voltage drop at the inner electrode. The width, length and thickness of the sample were microscopically checked, from which an electric conductivity was determined.

4. Rocking characteristic (°)

A rocking characteristic at a peak of a diffraction line (002) of graphite was measured using an X-ray diffraction apparatus (Rotor Flex RU-200B, made by Rigaku Denki K. K.). The rocking characteristic was determined as a half-value width of the obtained absorption curve.

It will be noted that Examples 1 to 9 describe a two-step procedure including thermal treatment and hot pressing and Example 10 describes a one-step hot pressing procedure.

EXAMPLE 1

25 micrometer thick polyoxadiazole films (available from Furukawa Denko K. K. were each placed between quartz plates, heated at a rate of 20° C./minute in an atmosphere of a nitrogen gas and subjected to low temperature treatment at 1000° C. for 1 hour. The resultant films were sandwiched between graphite substrates, heated from room temperature at a rate of 10° C./minute in a stream of argon and thermally treated for 1 hour at desired temperatures, $T_p$, followed by cooling at a rate of 20° C./minute. The furnace used was a carbon heating furance, Model 46-1, available from Shinsei Electric Furnace Co., Ltd.

The four films obtained above were subsequently subjected to ultra-high temperature hot pressing at a temperature of 2000° C. under a pressure of 20 kg/cm² for 1 hour. The physical properties of the graphite product prior to and after the hot pressing are shown in Table 2. It will be noted that when the temperature, $T_p$, was below 2000° C., the films were cracked by the hot pressing and could not be pressed.

TABLE 2

| | Prior to Hot Pressing | | | | After Hot Pressing | | | |
|---|---|---|---|---|---|---|---|---|
| $T_p$ °C. | Lattice Constant angstroms | Rate of Graphitization % | Electric Conductivity S/cm | Rocking Characteristic degree | Lattice Constant angstroms | Rate of Graphitization % | Electric Conductivity S/cm | Rocking Characteristic degree |
| 1000 | 6.93 | 0 | 345 | — | — | — | — | — |
| 1200 | 6.90 | 0 | 410 | — | — | — | — | — |
| 1400 | 6.89 | 0 | 510 | — | — | — | — | — |
| 1600 | 6.88 | 0 | 750 | — | — | — | — | — |
| 1800 | 6.86 | 11 | 900 | — | — | — | — | — |
| 2000 | 6.828 | 30 | 1400 | 26 | — | — | — | — |
| 2200 | 6.756 | 72 | 2300 | 18 | 6.753 | 74 | 2400 | 3.2 |
| 2600 | 6.713 | 97 | 7800 | 10.5 | 6.713 | 97 | 8200 | 1.4 |
| 2800 | 6.708 | 100 | 10000 | 9.7 | 6.708 | 100 | 11000 | 1.2 |

TABLE 2-continued

| | Prior to Hot Pressing | | | | After Hot Pressing | | | |
|---|---|---|---|---|---|---|---|---|
| $T_p$ °C. | Lattice Constant angstroms | Rate of Graphitization % | Electric Conductivity S/cm | Rocking Characteristic degree | Lattice Constant angstroms | Rate of Graphitization % | Electric Conductivity S/cm | Rocking Characteristic degree |
| 3000 | 6.708 | 100 | 14000 | 6.9 | 6.708 | 100 | 15000 | 1.0 |

As will be apparent from the results of Table 2, the hot pressing does not influence the lattice constant, the rate of graphitization and the electric conductivity to substantial extents, but contributes to improve the rocking characteristic remarkably. The graphite having such a rocking characteristic is very suitable for use as optical elements such as for X-rays.

EXAMPLE 2

In the same manner as in Example 1, the polyoxadiazole films were thermally treated at 2800° C. ($T_p$) and subjected to hot pressing under different conditions indicated in Table 3. The results are shown in Table 3. The pressing time was 1 hour.

TABLE 3

| Hot Pressing Conditions | | Lattice Constant Co angstroms | Rate of Graphitization % | Electric Conductivity S/cm | Rocking Characteristic degree |
|---|---|---|---|---|---|
| Temperature (°C.) | Pressure (kg/cm²) | | | | |
| 1000 | 4 | 6.708 | 100 | 10000 | 9.4 |
| 1200 | 4 | 6.708 | 100 | 10000 | 9.2 |
| 1400 | 4 | 6.708 | 100 | 10000 | 8.8 |
| 1600 | 4 | 6.708 | 100 | 11000 | 8.0 |
| 1800 | 4 | 6.708 | 100 | 11000 | 6.2 |
| 2000 | 4 | 6.708 | 100 | 12000 | 1.7 |
| 2500 | 4 | 6.708 | 100 | 13000 | 1.4 |
| 1600 | 10 | 6.708 | 100 | 10000 | 7.2 |
| 1600 | 20 | 6.708 | 100 | 10000 | 7.8 |
| 1600 | 40 | 6.708 | 100 | 11000 | 7.4 |
| 1600 | 100 | 6.708 | 100 | 12000 | 7.1 |
| 2500 | 10 | 6.708 | 100 | 13000 | 1.1 |
| 2500 | 20 | 6.708 | 100 | 14000 | 0.90 |
| 2500 | 40 | 6.708 | 100 | 15000 | 0.70 |
| 2500 | 100 | 6.708 | 100 | 15000 | 0.50 |
| 2800 | 40 | 6.708 | 100 | 17000 | 0.40 |
| 2800 | 100 | 6.708 | 100 | 18000 | 0.28 |

As will be apparent from the above results, the polyoxadiazole films were not bonded or combined together when the hot pressing was effected under conditions of a temperature of lower than 2000° C. and a pressure of lower than 4 kg/cm². In addition, the rocking characteristic is not improved under such conditions.

In contrast, when the hot pressing is effected under higher temperature and higher pressure conditions, the bonding is satisfactory with a significantly improved rocking characteristic. Higher temperatures and higher pressures are both more effective in improving the rocking characteristic. Under pressing conditions of 2800° C. and 100 kg/cm², the rocking characteristic is as high as 0.28°. A further improvement can be achieved by prolonging the pressing time. When the pressing was effected under conditions of 2800° C., 200 kg/cm² and 2 hours, the rocking characteristic was found to be 0.26°.

EXAMPLE 3

Polyoxadiazole films treated in the same manner as in Example 2 at 2800° C. were hot pressed at 2800° C. under a pressure of 40 kg/cm² for 1 hour. For the hot pressing, 4 films, 12 films, 40 films and 110 films were, respectively, used. The resultant graphite products had thicknesses of 38 micrometers, 110 micrometers, 380 micrometers and 1 mm, respectively. The physical characteristics of these graphite products including the rocking characteristic were substantially the same. Thus, thick graphite sheets or blocks as desired could be obtained by the above procedure.

EXAMPLE 4

25 micrometer thick polyimide films (commercial name of Kapton H film, commercially available from Du Pont De Numerous) were placed between quartz plates, heated at a rate of 20° C./minute in an atmosphere of a nitrogen gas, and subjected to low temperature thermal treatment at 1000° C. for 1 hours. The thermally treated films were sandwiched between graphite substrates, heated at a rate of 10° C./minute from room temperature in a stream of argon, thermally treated at a desired temperature, $T_p$, for 1 hour, and cooling at a rate of 20° C./minute. The furnace used was a carbon heating furnace (46-1 Type, made by Shinsei Electric Furnace Co., Ltd.).

Four films obtained were subjected to hot pressing by the use of a ultra-high temperature hot press at a temperature of 1600° C. under a pressure of 20 kg/cm² for 1 hour. The physical properties of the graphite prior to and after the hot pressing are shown in Table 4. It will be noted that the films thermally treated at a $T_p$ temperature lower than 2000° C., inclusive, could not be pressed by formation of cracks in the films.

TABLE 4

| | Prior to Hot Pressing | | | | After Hot Pressing | | | |
|---|---|---|---|---|---|---|---|---|
| $T_p$ °C. | Lattice Constant angstroms | Rate of Graphitization % | Electric Conductivity S/cm | Rocking Characteristic degree | Lattice Constant angstroms | Rate of Graphitization % | Electric Conductivity S/cm | Rocking Characteristic degree |
| 1000 | 6.92 | 0 | — | — | — | — | — | — |
| 1200 | 6.91 | 0 | 500 | — | — | — | — | — |
| 1400 | 6.89 | 0 | 630 | — | — | — | — | — |
| 1600 | 6.88 | 0 | 900 | — | — | — | — | — |
| 1800 | 6.86 | 12 | 1300 | — | — | — | — | — |
| 2000 | 6.83 | 29 | 1800 | 26 | — | — | — | — |
| 2200 | 6.768 | 65 | 3400 | 18 | 6.763 | 68 | 3400 | 3.7 |
| 2600 | 6.718 | 94 | 6200 | 11 | 6.716 | 95 | 6300 | 2.8 |
| 2800 | 6.712 | 98 | 10000 | 9.7 | 6.711 | 98 | 11000 | 1.8 |
| 3000 | 6.708 | 100 | 14000 | 6.9 | 6.708 | 100 | 15000 | 1.4 |

As will be apparent from the above results, the rocking characteristic is remarkably improved by hot pressing similar to the case of the polyoxadiazole films.

EXAMPLE 5

Aromatic polyimide films were thermally treated at 2800° C. ($T_p$) in the same manner as in Example 4 and hot pressed for 1 hour under different conditions. The results are shown in Table 5.

TABLE 5

| Hot Pressing Conditions | | Lattice Constant Co angstroms | Rate of Graphitization % | Electric Conductivity S/cm | Rocking Characteristic degree |
|---|---|---|---|---|---|
| Temperature (°C.) | Pressure (kg/cm²) | | | | |
| 1000 | 4 | 6.712 | 98 | 10000 | 9.4 |
| 1200 | 4 | 6.712 | 98 | 10000 | 9.2 |
| 1400 | 4 | 6.712 | 98 | 10000 | 5.8 |
| 1600 | 4 | 6.711 | 98 | 11000 | 3.0 |
| 1800 | 4 | 6.710 | 99 | 11000 | 2.2 |
| 2000 | 4 | 6.710 | 99 | 12000 | 1.7 |
| 2500 | 4 | 6.709 | 99 | 13000 | 1.4 |
| 1600 | 10 | 6.711 | 98 | 11000 | 2.2 |
| 1600 | 20 | 6.711 | 98 | 11000 | 1.8 |
| 1600 | 40 | 6.710 | 99 | 12000 | 1.4 |
| 1600 | 100 | 6.710 | 99 | 12000 | 1.1 |
| 2500 | 10 | 6.710 | 99 | 13000 | 1.1 |
| 2500 | 20 | 6.711 | 99 | 14000 | 0.9 |
| 2500 | 40 | 6.709 | 99 | 15000 | 0.71 |
| 2500 | 100 | 6.709 | 99 | 15000 | 0.52 |
| 2800 | 40 | 6.708 | 100 | 17000 | 0.41 |
| 2800 | 100 | 6.708 | 100 | 18000 | 0.28 |

As will be apparent from the above results, the polyimide films were not bonded together when the hot pressing was effected under conditions of a temperature of lower than 2000° C. and a pressure of lower than 4 kg/cm², similar to the case of the polyoxadiazole films. In addition, the rocking characteristic is not improved.

In contrast, when the hot pressing is effected under higher temperature and higher pressure conditions, the bonding is satisfactory with a significantly improved rocking characteristic. Higher temperatures and higher pressures are both more effective in improving the rocking characteristic. Under pressing conditions of 2800° C. and 100 kg/cm², the rocking characteristic is as high as 0.28°. A further improvement can be achieved by prolonging the pressing time. When the pressing was effected under conditions of 2800° C., 200 kg/cm² and 2 hours, the rocking characteristic was found to be 0.20°.

EXAMPLE 6

Aromatic polyimide films treated in the same manner as in Example 5 at 2800° C. were hot pressed at 2800° C. under a pressure of 40 kg/cm² for 1 hour. For the hot pressing, 4 films, 12 films, 40 films and 110 films were, respectively, used. The resultant graphite products had thicknesses of 38 micrometers, 110 micrometers, 380 micrometers and 1 mm, respectively. The physical characteristics of these graphite products including the rocking characteristic were substantially the same. Thus, graphite sheets or blocks with a desired thickness could be obtained by the above procedure.

EXAMPLE 7

10 micrometer thick aromatic polyamide films were placed between quartz plates, heated at a rate of 20° C./minute in an atmosphere of a nitrogen gas, and subjected to low temperature thermal treatment at 1000° C. for 1 hour. The thus thermally treated films were sandwiched between graphite substrates, heated at a rate of 10° C./minute from room temperature in a stream of argon, thermally treated at a desired temperature, $T_p$, for 1 hour, and cooled at a rate of 20° C./minute. The furnace used was a carbon heating furnace (46-1 Type, made by Shinsei Electric Furnace Co., Ltd.).

Four films obtained were subjected to hot pressing by the use of a ultra-high temperature hot press at a temperature of 2500° C. under a pressure of 20 kg/cm² for 1 hour. The physical properties of the graphite prior to and after the hot pressing are shown in Table 6.

TABLE 6

| | Prior to Hot Pressing | | | | After Hot Pressing | | | |
|---|---|---|---|---|---|---|---|---|
| $T_p$ °C. | Lattice Constant angstroms | Rate of Graphitization % | Electric Conductivity S/cm | Rocking Characteristic degree | Lattice Constant angstroms | Rate of Graphitization % | Electric Conductivity S/cm | Rocking Characteristic degree |
| 1000 | 6.95 | 0 | 243 | — | — | — | — | — |
| 1200 | 6.94 | 0 | 350 | — | — | — | — | — |
| 1400 | 6.91 | 0 | 980 | — | — | — | — | — |
| 1600 | 6.87 | 0 | 980 | — | — | — | — | — |
| 1800 | 6.86 | 11 | 1200 | — | — | — | — | — |
| 2000 | 6.82 | 30 | 1900 | 26 | — | — | — | — |
| 2200 | 6.78 | 72 | 2450 | 18 | 6.72 | 93 | 7400 | 1.7 |
| 2600 | 6.713 | 97 | 7800 | 10.5 | 6.713 | 97 | 8200 | 1.4 |
| 2800 | 6.710 | 100 | 13800 | 9.7 | 6.708 | 100 | 16000 | 1.2 |
| 3000 | 6.708 | 100 | 18000 | 6.9 | 6.708 | 100 | 19000 | 1.1 |

As will be apparent from the above results, the rocking characteristic is remarkably improved by hot pressing similar to the case of the polyoxadiazole films although the lattice constant, rate of graphitization and electric conductivity are not influenced significantly. The graphite is optimumly applicable to optical elements for X-rays.

EXAMPLE 8

Aromatic polyamide films were thermally treated at 2800° C. ($T_p$) in the same manner as in Example 4 and hot pressed for 1 hour under different conditions. The results are shown in Table 7.

TABLE 7

| Hot Pressing Conditions | | Lattice Constant Co angstroms | Rate of Graphitization % | Electric Conductivity S/cm | Rocking Characteristic degree |
|---|---|---|---|---|---|
| Temperature (°C.) | Pressure (kg/cm²) | | | | |
| 1000 | 4 | 6.710 | 99 | 14000 | 9.7 |
| 1200 | 4 | 6.710 | 99 | 14000 | 9.8 |
| 1400 | 4 | 6.710 | 99 | 14000 | 8.8 |
| 1600 | 4 | 6.710 | 99 | 15000 | 8.5 |
| 1800 | 4 | 6.710 | 99 | 15000 | 6.2 |
| 2000 | 4 | 6.710 | 99 | 15000 | 1.8 |
| 2500 | 4 | 6.708 | 100 | 16000 | 1.7 |
| 1600 | 10 | 6.710 | 99 | 14000 | 8.4 |
| 1600 | 20 | 6.710 | 99 | 14000 | 7.8 |
| 1600 | 40 | 6.710 | 99 | 14000 | 7.4 |
| 1600 | 100 | 6.710 | 99 | 15000 | 7.1 |
| 2500 | 10 | 6.710 | 99 | 14000 | 1.1 |
| 2500 | 20 | 6.710 | 99 | 14000 | 0.90 |
| 2500 | 40 | 6.710 | 99 | 15000 | 0.71 |
| 2500 | 100 | 6.708 | 100 | 15000 | 0.55 |
| 2800 | 40 | 6.708 | 100 | 19000 | 0.42 |
| 2800 | 100 | 6.708 | 100 | 19000 | 0.28 |

As will be apparent from the above results, the polyamide films were not bonded together when the hot pressing was effected under conditions of a temperature of lower than 2000° C. and a pressure of lower than 4 kg/cm², similar to the case of the polyoxadiazole films. In addition, the rocking characteristic is not improved.

In contrast, when hot pressing is effected under higher temperature and higher pressure conditions, the bonding is satisfactory with a significantly improved rocking characteristic. Higher temperatures and higher pressures are both more effective in improving the rocking characteristic. Under pressing conditions of 2800° C. and 100 kg/cm², the rocking characteristic was as high as 0.28°. A further improvement can be achieved by prolonging the pressing time. When the pressing was effected under conditions of 2800° C., 200 kg/cm² and 2 hours, the rocking characteristic was found to be 0.26°.

EXAMPLE 9

The films thermally treated at 2800° C. in the same manner as in Example 8 were hot pressed at 2800° C. under a pressure of 40 kg/cm² for 1 hour. For the hot pressing, 10 films, 20 films, 80 films and 200 films were used. The resultant graphite products had thicknesses of 38 micrometers, 110 micrometers, 380 micrometers and 1 mm, respectively, with similar rocking characteristics.

EXAMPLE 10

Aromatic polyimide films having thicknesses of 2, 10, 25, 50, 100, 200, 400, 600 and 800 micrometers were subjected to low temperature treatment at 1000° C. Two to twenty films of the respective thicknesses were, respectively, superposed and hot pressed by the use of a ultra-high temperature hot press. The temperature of the hot press increased at a rate of 10° C./minute and a pressure was gradually added in a temperature range of from 1000 to 2800° C. up to 4 kg/cm². When the temperature reached 2800° C., the pressure was increased to 40 kg/cm², followed by pressing at 3000° C. for 1 hour. The resultant graphite blocks were subjected to measurement of a rocking characteristic. The results are shown in Table 8 below.

TABLE 8

| Thickness of Starting Films (micrometers) | Number of Films Superposed | Rocking Characteristic (°) |
| --- | --- | --- |
| 2 | 20 | 0.50 |
| 10 | 20 | 0.65 |
| 10 | 10 | 0.62 |
| 25 | 20 | 0.67 |
| 25 | 10 | 0.65 |
| 50 | 10 | 0.67 |
| 100 | 10 | 0.72 |
| 200 | 10 | 0.85 |
| 200 | 5 | 0.82 |
| 400 | 5 | 0.96 |
| 600 | 5 | 1.54 |
| 600 | 2 | 1.29 |
| 800 | 5 | 2.21 |
| 800 | 2 | 2.01 |

The above results reveal that when the thickness of the starting film increases, the rocking characteristic tends to decrease. To ensure a very good rocking characteristic, it is preferred that the starting film thickness is not greater than 400 micrometers. The increase in number of starting films shows a tendency toward a slight decrease of the rocking characteristic but such a tendency is negligible.

As will be apparent from the foregoing examples, the graphite products obtained according to the invention are substantially the same as natural graphite and can be prepared simply with a remarkably improved rocking characteristic. In addition, graphite sheets or blocks having a desired thickness can be obtained according to the invention.

What is claimed is:

1. A method for marking a graphite sheet or block which comprises:
    (a) providing at least two films made of a polymer selected from the group consisting of a polyoxadiazole, an aromatic polyimide and an aromatic polyamide, said at least two films having, respectively, a thickness not greater than 400 micrometers; and
    (b) pressing the at least two films at a pressure of not lower than 4 kg/cm² at a temperature of not lower than 2200° C. for a time sufficient to graphitize the at least two films in an inert gas, thereby obtaining a graphite sheet or block.

2. A method according to claim 1, wherein said polymer is a polyoxadiazole.

3. A method according to claim 2, wherein said polyoxadiazole is poly(p-phenylene-1,3,4-oxadiazole), poly(m-phenylene-1,3,4-oxadiazole), poly(p-phenylene-1,2,4-oxadiazole), poly(m-phenylene-1,2,4-oxadiazole), poly(o-phenylene-1,3,4-oxadiazole) or poly(o-phenylene-1,2,4-oxadiazole).

4. A method according to claim 1, wherein said polymer is an aromatic polyimide.

5. A method according to claim 4, wherein said aromatic polyimide is a polymer obtained by reaction between a dicarboxylic acid and an aromatic primary diamine.

6. A method according to claim 1, wherein said polymer is an aromatic polyamide.

7. A method according to claim 6, wherein said aromatic polyamide has the following general formula wherein $R_3$ represents and $R_4$ represents 8. A method according to claim 1, wherein the hot pressing is effected at a temperature of not lower than 2500° C. at a pressure of not lower than 40 kg/cm².

9. A method for making a graphite sheet or block which comprises:
    (a) providing at least two films made of a polymer selected from the group consisting of a polyoxadiazole and an aromatic polyamide, said at least two films having, respectively, a thickness not greater than 400 micrometers;
    (b) thermally treating the at least two films at a temperature of not lower than 2200° C. for a time sufficient to graphitize the at least two films; and
    (c) hot pressing the graphitized films at a pressure of not lower than 4 kg/cm² at a temperature of not lower than 2000° C.

10. A method according to claim 9, wherein the thermal treatment is effected by sandwiching the at least two films between graphite substrates.

11. A method according to claim 9, wherein the hot pressing in (c) is effected at a temperature of not lower than 2500° C. under a pressure of not lower than 40 kg/cm².

12. A method for making a graphite sheet or block which comprises:
    (a) providing at least two films made of an aromatic polyimide, said at least two films having, respectively, a thickness not greater than 400 micrometers;
    (b) thermally treating the at least two films at a temperature of not lower than 2200° C. for a time sufficient to graphitize the at least two films; and
    (c) hot pressing the graphitized films at a pressure of not lower than 4 kg/cm² at a temperature of not lower than 1600° C.

* * * * *

UNITED STATES PATENT AND TRADEMARK OFFICE
CERTIFICATE OF CORRECTION

PATENT NO. : 4,954,193

DATED : September 4, 1990

INVENTOR(S) : Mutsuaki MURAKAMI; Naomi NISHIKI; Susumu YOSHIMURA; and Kazuhiro WATANABE It is certified that error appears in the above-identified patent and that said Letters Patent is hereby corrected as shown below:

ON TITLE PAGE: under "Foreign Application Priority Data", insert:

--Aug. 1, 1988 [JP] Japan ............. 63-192537--

Signed and Sealed this

Seventeenth Day of December, 1991

Attest:

HARRY F. MANBECK, JR.

*Attesting Officer*        *Commissioner of Patents and Trademarks*